(12) United States Patent
Armato

(10) Patent No.: US 9,916,562 B1
(45) Date of Patent: Mar. 13, 2018

(54) COMPETITIVE MERCHANDISE FULFILLMENT DELIVERY SPEED MONITORING

(71) Applicant: Amazon Technologies, Inc., Reno, NV (US)

(72) Inventor: Steven Simons Armato, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 68 days.

(21) Appl. No.: 14/287,894

(22) Filed: May 27, 2014

(51) Int. Cl.
*G06Q 10/00* (2012.01)
*G06Q 10/08* (2012.01)

(52) U.S. Cl.
CPC ................... *G06Q 10/087* (2013.01)

(58) Field of Classification Search
None
See application file for complete search history.

(56) References Cited

U.S. PATENT DOCUMENTS

| | | | | |
|---|---|---|---|---|
| 2008/0319843 | A1* | 12/2008 | Moser | G06Q 30/0223 705/14.24 |
| 2009/0076896 | A1* | 3/2009 | DeWitt | G06Q 30/02 705/14.17 |
| 2010/0306249 | A1* | 12/2010 | Hill | G06F 17/30867 707/769 |
| 2015/0012467 | A1* | 1/2015 | Greystoke | G06N 99/005 706/12 |
| 2015/0088642 | A1* | 3/2015 | Mathew | G06Q 30/0633 705/14.51 |

\* cited by examiner

*Primary Examiner* — Fateh M Obaid
(74) *Attorney, Agent, or Firm* — Eversheds Sutherland (US) LLP

(57) ABSTRACT

This disclosure describes systems, methods, and computer-readable media related to competitive merchandise fulfillment delivery speed monitoring. Competitor merchants for a geographic region may be identified. Data for merchandise from sources associated with the competitor merchants may be obtained. A set of policies may be retrieved. The obtained data may be analyzed based at least in part on the policies to identify merchandise and an associated delivery speed available via the one or more competitor merchants. One or more suggested inventory management actions affecting the identified merchandise available via an online retailer may be generated based at least in part on the analyzed data. Implementation of at least one of the suggested inventory management actions may be facilitated. A website of the online retailer may be updated for the identified merchandise based at least in part on the implementation of the at least one of the one or more suggested inventory management actions.

14 Claims, 4 Drawing Sheets

COMPETITIVE MERCHANDISE FULFILLMENT DELIVERY SPEED MONITORING

BACKGROUND

Online retailers provide a variety of different merchandise for purchase. The merchandise may be available for delivery to the customer at different speeds (e.g., two-day shipping, standard shipping, etc.). In many cases, online retailers are at a disadvantage when a customer needs an item immediately. Customers may go directly to a brick-and-mortar store rather than an online retailer if they wish to acquire an item within a very short time period (e.g., same day). In many instances, the brick-and-mortar stores may have websites that the customers may check to purchase the items online but have the ability to pick up their purchases at a geographically close store.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
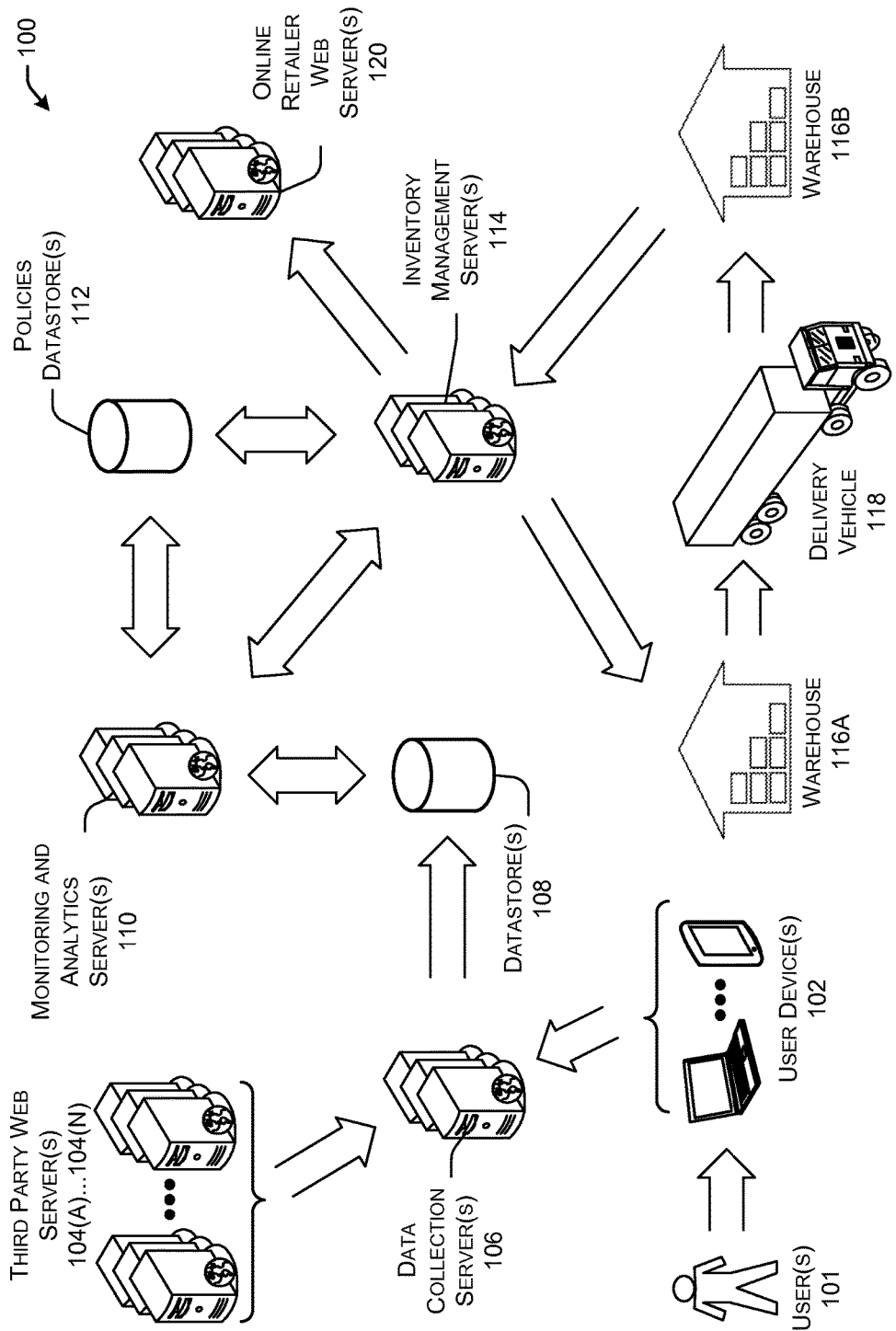
FIG. 1 depicts an illustrative data flow between various components of an illustrative system architecture for competitive merchandise delivery speed monitoring in accordance with one or more embodiments of the disclosure.

This disclosure relates to, among other things, systems, methods, computer-readable media, techniques, and methodology for competitive merchandise fulfillment delivery speed monitoring. Online retailers may provide the ability to match the fulfillment delivery speed of competing merchants by monitoring merchandise the competing merchants make available at various fulfillment delivery speeds. In some embodiments, the online retailers may match fulfillment delivery speeds of competing merchants within a specific geographic area or for a specific price point.

In some embodiments, a data collection server may identify one or more competitor merchants. Competitor merchants may be manually identified by a user, based on a variety of different factors (e.g., an annual revenue of a merchant, ranking of the merchant, identification of merchants based on user surveys, or the like). The data collection server may identify data sources associated with the competitor merchants (e.g., web servers) and scrape data from the data sources. In some embodiments, data may be obtained from customers and/or their user devices. Data that may be scraped and/or obtained from the data sources may include information associated with items for purchase, availability of merchandise, fulfillment delivery speed (e.g., different modes and times for delivery of merchandise), pricing associated with the merchandise, pricing associated with the fulfillment delivery speed, availability of in-store pick up, and the like. In some embodiments, data associated with customers of the online retailer (e.g., recent purchases and chosen merchandise fulfillment delivery speeds) may be analyzed to identify potential merchandise that should be monitored in association with competitor merchants. The data may be stored to one or more datastores.

In some embodiments, a server of an online retailer may retrieve data from the datastore and process the data. The server may retrieve one or more policies from a policy datastore. The policies may include rules for filtering merchandise characteristics. For example, the policies may be used to identify merchandise from competitor merchants that have been available for one-day delivery for over a pre-determined threshold (e.g., four weeks) or for which the fulfillment delivery speed was available at a pre-determined pricing for over a pre-determined threshold. The server may identify merchandise available via one or more competitor merchants for specific merchandise fulfillment delivery speeds. In some embodiments, the server may identify that the merchandise is available from the competitor merchants at the merchandise fulfillment delivery speeds only within a specific geographic region or at a specific pricing.

In some embodiments, suggested inventory management actions may be generated based on the analyzed data identifying merchandise and associated fulfillment delivery speeds available from competitor merchants. For example, an inventory management action may include ordering merchandise to specific geographic fulfillment center locations associated with the online retailer to facilitate quicker delivery speeds for the merchandise. Another example may be to transfer inventory for identified merchandise between fulfillment center locations to facilitate quicker delivery speeds for the merchandise. In some embodiments, the suggested inventory management actions may be presented to a user and an indication from the user may be required prior to implementation of a suggested inventory management action. In some embodiments, the suggested inventory management actions may be prioritized based one or more policies and implemented based at least in part on the prioritization of the actions.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

ILLUSTRATIVE USE CASES AND SYSTEM ARCHITECTURE

FIG. 1 depicts an illustrative data flow between various components of an illustrative system architecture for competitive merchandise fulfillment delivery speed monitoring in accordance with one or more embodiments of the disclosure. One or more illustrative user device(s) 102 are illustratively depicted in FIG. 1. The user device(s) 102 may include any suitable processor-driven computing device able to provide and execute user applications and/or transmit and receive information over a network, such as requesting and receiving webpages. The user device(s) 102 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the user device(s) 102 may be described herein in the singular; however, it should be appreciated that multiple user device(s) 102 may be provided.

One or more illustrative third party web server(s) 104(A)-104(N) (collectively 104) are illustratively depicted in FIG. 1. The third party web server(s) 104 may include any suitable processor-driven computing device able to provide content, such as webpages. In some embodiments, the content may be data associated with merchandise and associated data (e.g., availability, pricing, delivery speed options, etc.) The third party web server(s) 104 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the third party web server(s) 104 may be described herein in the singular; however, it should be appreciated that multiple third party web server(s) 104 may be provided. The third party web server(s) 104 may provide content, such as webpages. In some embodiments the webpages may include merchandise information, such as a description of an item for purchase, an identifier associated with the item (e.g., barcode or SKU), quantity available for purchase, fulfillment delivery speed (e.g., time for item to be delivered to customer after purchase), fulfillment delivery pricing, or the like. In some embodiments, the web pages may be associated with a competitor merchant of an online retailer or an e-commerce system.

The data collection server(s) 106 may obtain merchandise information from one or more user(s) 101, one or more user device(s) 102, one or more third party web server(s) 104 or other sources (e.g., datastores). For example, user(s) 101 may provide data to the data collection server(s) 106 via user device(s) 102. In some embodiments, the user(s) 101 may scan a code associated with a product while in a store using a user application. The code, such as a barcode or QR code may be used to obtain information associated with the product, such as a price or availability of the product from another retailer. In some embodiments, the information obtained by the user application may be transmitted to the data collection server(s) 106 (e.g., as a background process of the application). In some embodiments, the user(s) 101 may use a user device 102 to scan codes for products in exchange for financial compensation (e.g., users 101 may be paid to go into stores to obtain inventory information in the store). In some embodiments, the user(s) 101 may transmit information directly to the data collection server(s) 106, such as responses to a survey or as an inquiry (e.g., requesting information why a product is not available via a particular fulfillment speed from an online retailer). In some embodiments, the data collection server(s) 106 may scrape or collect data from sources (e.g., third party web server(s) 104) associated with competitor merchants. The data collection server(s) 106 may obtain data and transmit the data to one or more datastores 108. In some embodiments, the data collection server(s) 106 may obtain merchandise information from one or more sources on a periodic basis (e.g., daily, weekly, monthly, etc.). The data collection server(s) 106 may include any suitable processor-driven computing device including, but not limited to, a desktop computing device, a laptop computing device, a server, a smartphone, a tablet, and so forth. For ease of explanation, the data collection server(s) 106 may be described herein in the singular; however, it should be appreciated that multiple data collection server(s) 106 may be provided.

The monitoring and analytics server(s) 110 may retrieve data from one or more datastore(s) 108 and analyze the retrieved data. The monitoring and analytics server(s) 110 may analyze the data based at least in part on the one or more policies (e.g., retrieved from one or more policies datastore(s) 112), to identify an item available for purchase from the merchandise data and an associated delivery speed available via the one or more competitor merchants. In some embodiments, the monitoring and analytics server(s) 110 may utilize machine learning algorithms and/or artificial intelligence to analyze and/or monitor the data. The monitoring and analytics server(s) 110 may include any suitable processor-driven computing device including, but not limited to, a desktop computing device, a laptop computing device, a server, a smartphone, a tablet, and so forth. For ease of explanation, the monitoring and analytics server(s) 110 may be described herein in the singular; however, it should be appreciated that multiple monitoring and analytics server(s) 110 may be provided.

The inventory management server(s) 114 may receive data from one or more monitoring and analytics server(s) 110 and analyze the received data. The inventory management server 114 may generate one or more suggested inventory management actions based at least in part on the received data. The inventory management server(s) 114 may utilize machine learning algorithms and/or artificial intelligence to generate and/or select suggested inventory management actions. The inventory management server(s) 114 may include any suitable processor-driven computing device including, but not limited to, a desktop computing device, a laptop computing device, a server, a smartphone, a tablet, and so forth. For ease of explanation, the inventory management server(s) 114 may be described herein in the singular; however, it should be appreciated that multiple inventory management server(s) 114 may be provided.

In one example embodiment, a suggested inventory management action may be to transfer inventory from one geographic region to another geographic region in order to meet consumer demands. The inventory management server(s) 114 may also communicate with, for example, a warehouse 116A located, for example, in the western part of Massachusetts (e.g., via an inventory management device for the warehouse 116A). The inventory management server(s) 114 may identify a product and quantity of the product that should be shipped to a warehouse 116B located, for example, in the eastern part of Massachusetts to meet the higher consumer demands for faster product fulfillment speeds for Boston, Mass., for example. A worker in the first warehouse 116A may facilitate the packing and shipping of the identified products via a delivery truck 118 to the second warehouse 116B. Once the product has been delivered to the second warehouse 116B, a worker in the second warehouse 116B may update the inventory information for the second warehouse 116B using an inventory management device of the second warehouse 116B to communicate the receipt of the product to the inventory management server(s) 114. The inventory management server(s) 114 may receive data from second warehouse 116B. The inventory management server 114 may then transmit data to one or more online retailer web server(s) 120 regarding the updated inventory and associated fulfillment delivery speeds for the inventory.

The online retailer web server(s) 120 may receive data from the inventory management server(s) 114 regarding the updated inventory and associated fulfillment delivery speeds and may update information published on the online retailer websites. The online retailer web server(s) 120 may include any suitable processor-driven computing device including, but not limited to, a desktop computing device, a laptop computing device, a server, a smartphone, a tablet, and so forth. For ease of explanation, the online retailer web server(s) 120 may be described herein in the singular; however, it should be appreciated that multiple online retailer web server(s) 120 may be provided.

Figure 2:
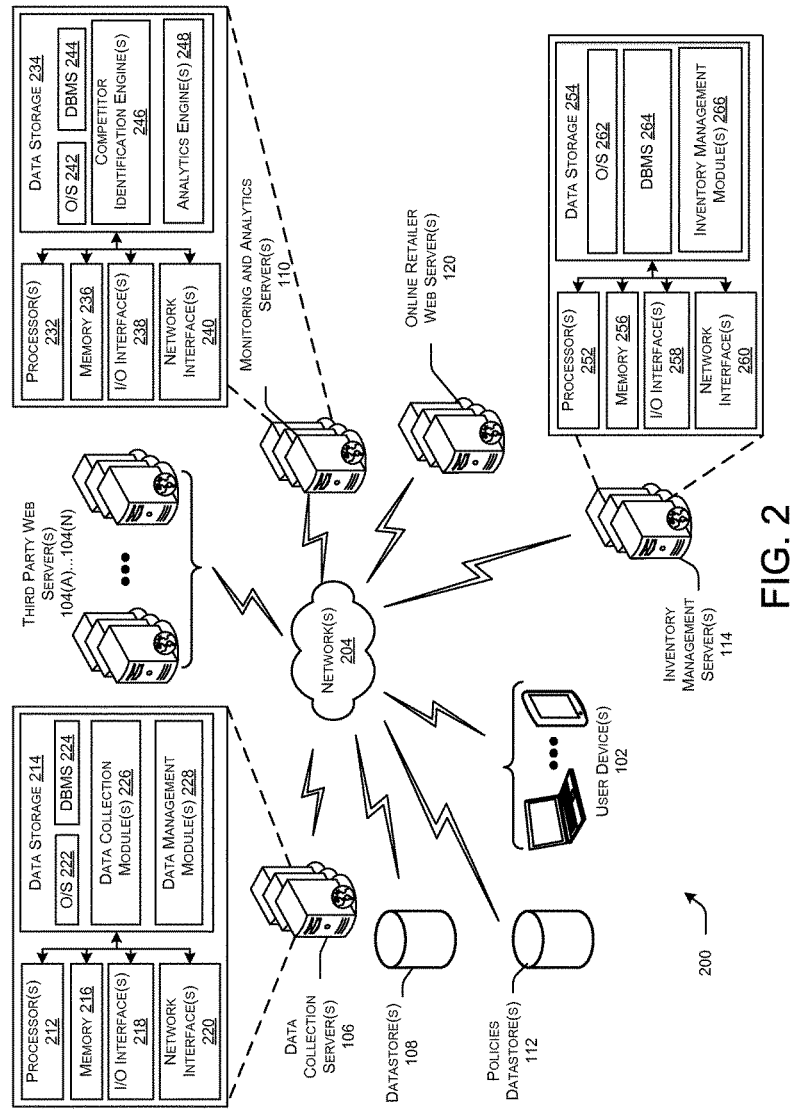
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more user device(s) 102, one or more third party web server(s) 104, one or more data collection server(s) 106, one or more datastore(s) 108, one or more monitoring and analytics server(s) 110, one or more policies datastore(s) 112, one or more inventory management server(s) 114, and/or one or more online retailer web server(s) 120. The user device(s) 102, third party web server(s) 104, data collection server(s) 106, datastore(s) 108, monitoring and analytics server(s) 110, policies datastore(s) 112, inventory management server(s) 114, and/or online retailer web server(s) 120 may include any of the types of devices described through reference to FIG. 1.

Any of the user device(s) 102, third party web server(s) 104, data collection server(s) 106, datastore(s) 108, monitoring and analytics server(s) 110, policies datastore(s) 112, inventory management server(s) 114, and/or online retailer web server(s) 120 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The data collection server(s) 106 may include one or more processor(s) 212 and one or more memories 216 (referred to herein generically as memory 216). The processor(s) 212 may include any suitable processing unit capable of accepting data as input, processing the input data based on stored computer-executable instructions, and generating output data. The computer-executable instructions may be stored, for example, in the data storage 214 and may include, among other things, operating system software and application software. The computer-executable instructions may be retrieved from the data storage 214 and loaded into the memory 216 as needed for execution. The processor(s) 212 may be configured to execute the computer-executable instructions to cause various operations to be performed. The processor(s) 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 214 may store program instructions that are loadable and executable by the processor(s) 212, as well as data manipulated and generated by the processor(s) 212 during execution of the program instructions. The program instructions may be loaded into the memory 216 as needed for execution. Depending on the configuration and implementation of the data collection server(s) 106, the memory 216 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 216 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The data collection server(s) 106 may further include additional data storage 214 such as removable storage and/or non-removable storage including, but not limited to, magnetic storage, optical disk storage, and/or tape storage. Data storage 214 may provide non-volatile storage of computer-executable instructions and other data. The memory 216 and/or the data storage 214, removable and/or non-removable, are examples of computer-readable storage media (CRSM).

The data collection server(s) 106 may further include network interface(s) 220 that facilitate communication between the data collection server(s) 106 and other devices of the illustrative system architecture 200 (e.g., third party web server(s) 104, datastore(s) 108, etc.) or application software via the network(s) 204. The third party web server(s) 104 may additionally include one or more input/output (I/O) interfaces 218 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 214, various program modules, applications, or the like may be stored therein that may comprise computer-executable instructions that when executed by the processor(s) 212 cause various operations to be performed. The memory 216 may have loaded from the data storage 214 one or more operating systems (O/S) 222 that may provide an interface between other application software (e.g., dedicated applications, a browser application, a web-based application, a distributed client-server application, etc.) executing on the data collection server(s) 106 and the hardware resources of the data collection server(s) 106. More specifically, the O/S 222 may include a set of computer-executable instructions for managing the hardware resources of the data collection server(s) 106 and for providing common services to other application programs (e.g., managing memory allocation among various application programs). The O/S 222 may include any operating system now known or which may be developed in the future including, but not limited to, any mobile operating system, desktop or laptop operating system, mainframe operating system, or any other proprietary or open-source operating system.

The data storage 214 may further include one or more database management systems (DBMS) 224 for accessing, retrieving, storing, and/or manipulating data stored in one or more datastores (e.g., datastore 108). The DBMS 224 may use any of a variety of database models (e.g., relational model, object model, etc.) and may support any of a variety of query languages.

The data storage 214 may additionally include various other program modules that may include computer-executable instructions for supporting a variety of associated functionality. For example, the data storage 214 may include one or more data collection module(s) 226 and/or one or more data management module(s) 228.

The data collection module(s) 226 may include computer-executable instructions that in response to execution by the processor(s) 212 cause operations to be performed including identifying one or more sources of information (e.g., third party web server(s) 104, remote server(s), etc.), establishing a connection with one or more sources, and/or scraping data from the one or more sources.

The data management module(s) 228 may include computer-executable instructions that in response to execution by the processor(s) 212 cause operations to be performed including determining whether the one or more sources have been previously identified, determining whether data has been collected from the one or more sources, tracking when data was previously collected, track which data was stored to one or more datastore(s) 108, and the like.

Within the data storage 214, one or more modules may be stored. As used herein, the term module may refer to a functional collection of instructions that may be executed by the one or more processor(s) 212. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The monitoring and analytics server(s) 110 may include one or more processor(s) 232 and one or more memories 236 (referred to herein generically as memory 236). The processor(s) 232 may include any suitable processing unit capable of accepting data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the monitoring and analytics server(s) 110, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The monitoring and analytics server(s) 110 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The monitoring and analytics server(s) 110 may further include network interface(s) 240 that facilitate communication between the monitoring and analytics server(s) 110 and other devices of the illustrative system architecture 200 (e.g., data collection server(s) 106, datastore(s) 108, etc.) or application software via the network(s) 204. The monitoring and analytics server(s) 110 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the monitoring and analytics server(s) 110 and the hardware resources of the monitoring and analytics server(s) 110. More specifically, the O/S 242 may include a set of computer-executable instructions for managing the hardware resources of the monitoring and analytics server(s) 110 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 108). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more competitor identification engine(s) 246 and/or one or more analytics engine(s) 248.

The competitor identification engine(s) 246 may include computer-executable instructions that in response to execution by the processor(s) 232 cause operations to be performed including retrieving data from one or more datastore(s) 108, retrieving one or more policies from a policies datastore 112, analyzing the data retrieved from the data store 108 based at least in part on the policies retrieved from the policies datastore 112, and/or identifying one or more possible competitor merchants based on the analyzed data.

The analytics engine(s) 248 may include computer-executable instructions that in response to execution by the processor(s) 232 cause operations to be performed including retrieving data from one or more datastore(s) 108, retrieving one or more policies from a policies datastore 112, analyzing the data retrieved from the data store 108 based at least in part on the policies retrieved from the policies datastore 112, and/or identifying one or more merchandise data and associated delivery speeds from identified competitor merchants based on the analyzed data. In some embodiments, the analytics engine(s) 248 may utilize machine learning algorithms to analyze and monitor data.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The inventory management server(s) 114 may include one or more processor(s) 252 and one or more memories 256 (referred to herein generically as memory 256). The processor(s) 252 may include any suitable processing unit capable of accepting data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the inventory management server(s) 114, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The inventory management server(s) 114 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The inventory management server(s) 114 may further include network interface(s) 260 that facilitate communication between the inventory management server(s) 114 and other devices of the illustrative system architecture 200 (e.g., data collection server(s) 106, datastore(s) 108, etc.) or application software via the network(s) 204. The inventory management server(s) 114 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the inventory management server(s) 114 and the hardware resources of the inventory management server(s) 114. More specifically, the O/S 262 may include a set of computer-executable instructions for managing the hardware resources of the inventory management server(s) 114 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 108). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more inventory management module(s) 266.

The inventory management module(s) 266 may include computer-executable instructions that in response to execution by the processor(s) 252 cause operations to be performed including receive data from the monitoring and analytics server(s) 110, analyze the received data, retrieve one or more policies from a policies datastore 112, and/or generate one or more suggested inventory management actions. In some embodiments, the inventory management module 266 may facilitate presentation of the suggested inventory management actions to a user 101 and receive input from the user 101 regarding which suggested inventory management action to implement. The generation and/or implementation of the suggested inventory management actions may be done using machine learning algorithms and/or artificial intelligence.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

ILLUSTRATIVE PROCESSES

Figure 3:
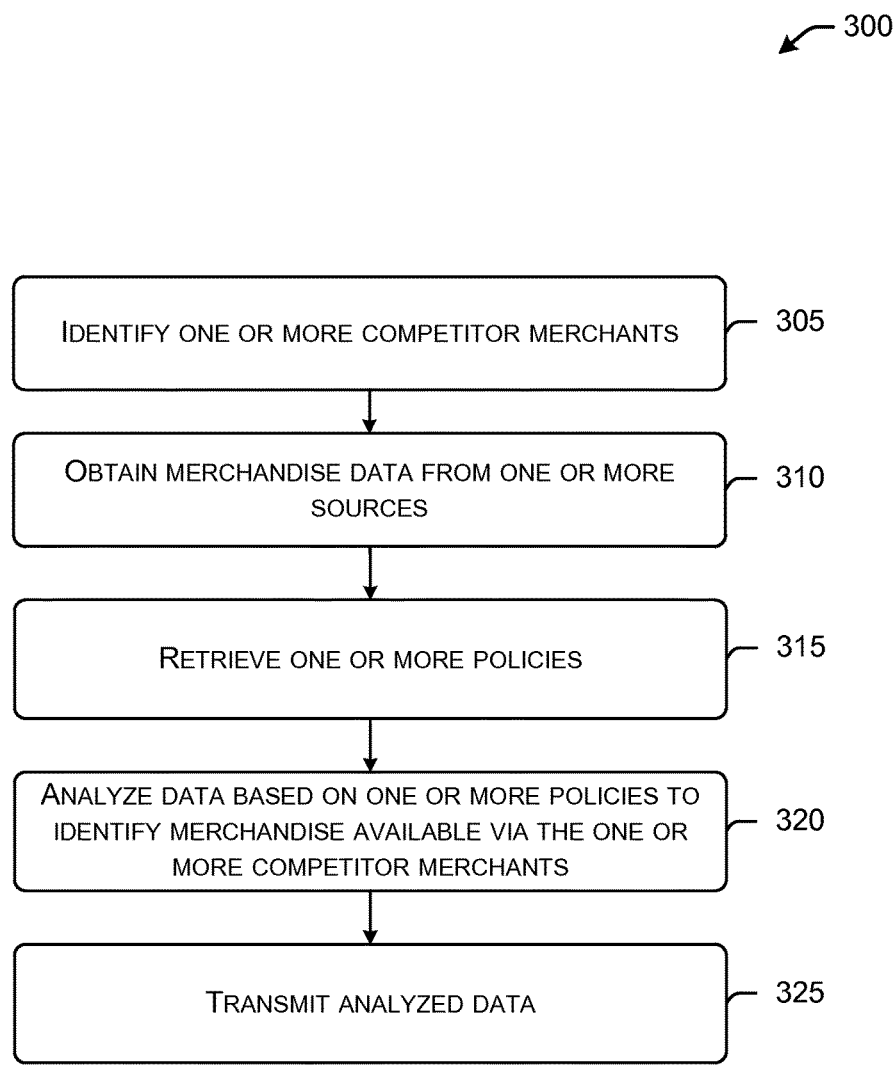
FIG. 3 is a process flow diagram of an illustrative method for analyzing data for competitive merchandise delivery speed monitoring in accordance with one or more embodiments of the disclosure.

FIG. 3 is a process flow diagram of an illustrative method 300 for analyzing data for competitive merchandise delivery speed monitoring in accordance with one or more embodiments of the disclosure. At block 305, one or more competitor merchants may be identified. In some embodiments, the competitors identification engine 246 may be identify the one or more competitor merchants in a specific geographic region. In some embodiments, a user may specify a geographic region (e.g., identifying a geographic region by entering a zip code or address). Competitor merchants may be manually identified by a user. In some embodiments, the competitor merchants may be identified based on a variety of factors, which may include but are not limited to an annual revenue of a merchant, ranking of the merchant based on a measurement of popularity (e.g., consumer preferences, etc.), user search queries (e.g., searches conducted by users to identify merchants), or identification of merchants based on user surveys.

At block 310, merchandise data may be obtained from one or more sources. In some embodiments, merchandise data may be obtained from sources associated with the identified competitor merchants. Examples of sources may include, but are not limited to a third party web server 104, a datastore 108, data received from a user 101 compensated for obtaining and transmitting data via a user device 102, data received from the user device 102 as a user 101 interacts with a user application (e.g., user 101 scans a product in a store to obtain further information about the product), or direct feedback from the user 101. In some embodiments, the merchandise data may include a merchandise identifier, such as a SKU, merchandise availability, merchandise fulfillment delivery speed for a geographic area, a merchandise delivery region (e.g., geographic areas where the merchandise may be delivered), merchandise pricing, and/or pricing associated with the merchandise delivery speed. The one or more sources may include websites of the identified competitor merchants provided by one or more third party web servers 104, user device(s) 102, users 101, one or more datastore(s) 108 associated with the identified competitor merchants, or the like.

At block 315, one or more policies may be retrieved. In some embodiments, the policies may be retrieved from a policies datastore 112. In some embodiments, the policies may include one or more rules that may be applied to data during data analysis. In some embodiments, the rules of the policies may include pre-determined thresholds or filters based on merchandise characteristics. For example, a policy may identify merchandise that has been available from a competitor merchant at a particular fulfillment delivery speed (e.g., one-day shipping) for over a four week period and/or within an identified geographic area.

At block 320, the data may be analyzed based on the one or more policies to identify merchandise and associated fulfillment delivery speed available via the one or more competitor merchants. In some embodiments, the data may be analyzed by the analytics engine 248.

At block 325, the analyzed data may be transmitted. In some embodiments, the analyzed data may be transmitted to an inventory management server 114. In some embodiments, the analyzed data may be transmitted to an inventory management module 266.

Figure 4:
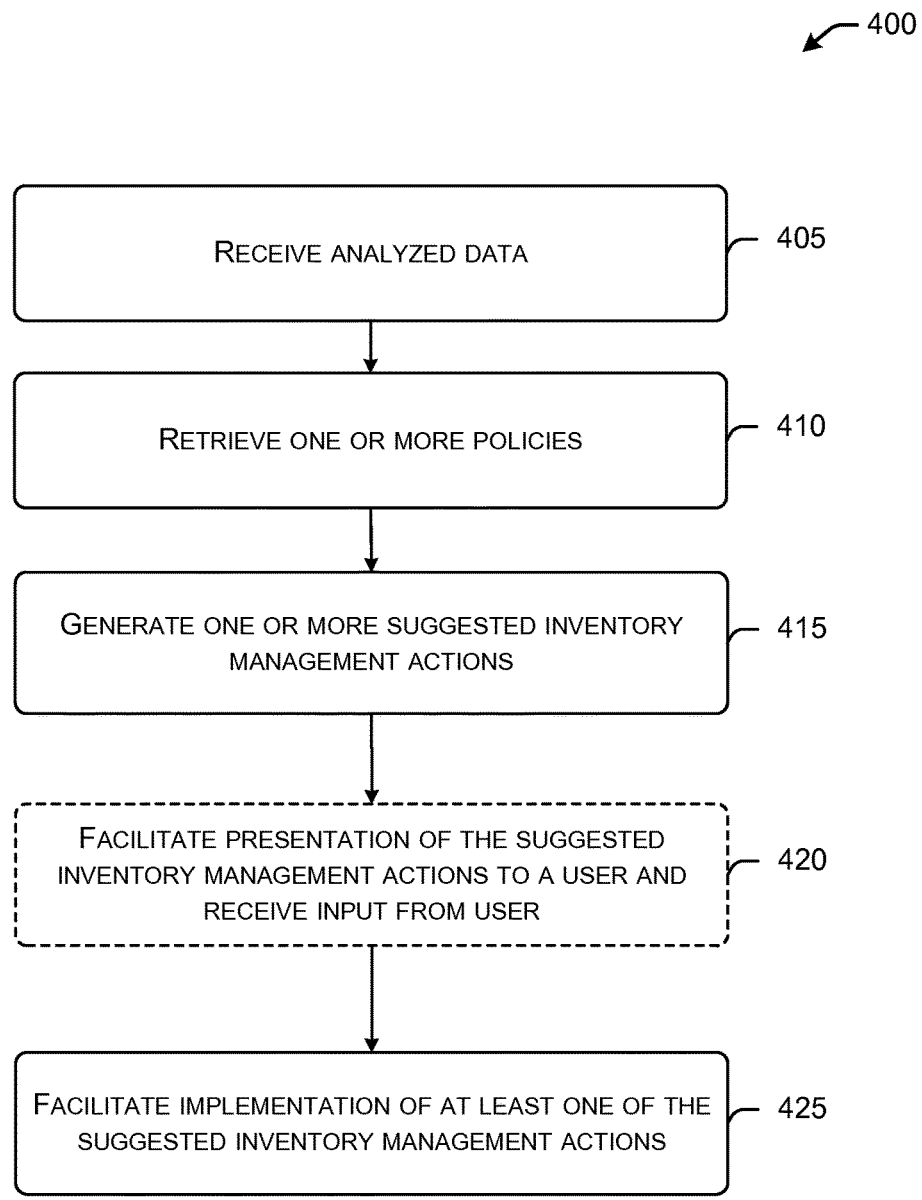
FIG. 4 is a process flow diagram of an illustrative method for generating inventory management actions for competitive merchandise delivery speed monitoring in accordance with one or more embodiments of the disclosure.

FIG. 4 is a process flow diagram of an illustrative method 400 for generating inventory management actions associated with identified merchandise for competitive merchandise delivery speed monitoring in accordance with one or more embodiments of the disclosure. At block 405, the analyzed data may be received from the monitoring and analytics server 110 and/or the analytics engine 248. In some embodiments, the analyzed data may be received by an inventory management server 114. In some embodiments, the analyzed data may be received by an inventory management module 266.

At block 410, one or more policies may be retrieved. In some embodiments, the policies may be retrieved from one or more policies datastores 112. The one or more policies retrieved may comprise rules for prioritizing suggested inventory management actions associated with identified merchandise. For example, the policies may indicate inventory management actions that include transferring merchandise to identified fulfillment centers of a geographic region with higher consumer demands from fulfillment centers of a geographic region with lower consumer demands should be prioritized over ordering items from a vendor.

In some embodiments, the policies may be directed to determining whether actions should be taken based on current competitor offerings for merchandise and their associated delivery speeds. For example, a policy may determine that if a competitor offers a substantially lower price for delivering an item to a particular geographic region, that the online retailer may or may not match the price. In such an instance, the suggested inventory management action may be to match or not match the price and delivery speed of the competitor. In some embodiments, the data may indicate that the online retailer is the only merchant offering delivery of an item to a geographic region at a lower price and faster delivery speed than other merchants. In such a scenario, the policy may be directed to generate a suggested inventory management action of increasing the price associated with delivering the item to the geographic location and/or modifying or eliminating the fulfillment delivery speed for that item.

At block 415, one or more suggested inventory management actions may be generated. In some embodiments, the inventory management module 266 may generate the one or more suggested inventory management actions associated with identified merchandise. Examples of suggested inventory management actions may include, but are not limited to, requesting an increased quantity of the identified merchandise to a fulfillment center located in the geographic region, requesting a decreased quantity of the identified merchandise to the fulfillment center located in the geographic region, initiating transfer of the identified merchandise to the fulfillment center located in the geographic region, or changing a price associated with delivery speed of the identified merchandise to the geographic region.

At optional block 420, the suggested inventory management actions may be presented to a user and input may be received from the user. For example, the suggested inventory management actions may be displayed to a user. In some embodiments, the user may select or confirm the implementation of a suggested inventory management action. The user may select at least one of the suggested inventory management actions or may rank or prioritize the suggested inventory management actions. The users input may be received by the inventory management module 266.

At block 425, at least one of the one or more suggested inventory management actions may be implemented. In some embodiments, the inventory management module 266 may facilitate implementation of at least one of the one or more suggested inventory management actions based on user input and/or prioritization of the suggested inventory management actions.

In some embodiments, once the inventory management action has been implemented, the inventory management module 266 may communicate with the online retailer web server 120 to facilitate updating the website to reflect the changes implemented in association with the merchandise. For example, if the suggested inventory management action was to transfer the merchandise to a fulfillment center in a high-demand geographic region or to increase product availability in the high-demand geographic region by ordering additional inventory to a fulfillment center in the geographic region, the website may be updated to reflect increased availability. If the pricing of the delivery speed has been changed (e.g., increased or decreased) or if the delivery speed has been modified or eliminated for a particular product, such changes may be transmitted to the web servers of the online retailer so that the updated information is reflected on the website and available to users.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a non-transitory computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method comprising:
    obtaining, by one or more processors of a computing device, merchandise data from sources associated with one or more merchants offering merchandise to users in a defined geographic region;
    retrieving, by the one or more processors, a set of one or more policies;
    analyzing, by the one or more processors, the obtained data, based at least in part on the one or more policies, to identify an item available for purchase from the merchandise data, pricing associated with the item, and an associated fulfillment delivery speed available via a first merchant of the one or more merchants in the defined geographic region, wherein the fulfillment delivery speed comprises a time for delivery to the defined geographic region;
    comparing the pricing associated with the item to a threshold price defined by the one or more policies to make a determination the pricing is greater than the threshold price;
    generating, by the one or more processors, one or more suggested inventory management actions affecting a price of the identified item available for purchase via a second merchant, and further affecting an availability, in the defined geographic region, of the identified item available for purchase via the second merchant;
    causing, by the one or more processors, the presentation of the one or more suggested inventory management actions by a user device;
    receiving, by the one or more processors, an indication corresponding to a selection, detected by the user device, of a desired inventory management action from the one or more suggested inventory management actions;
    based at least in part on the selection detected by the user device, facilitating, by the one or more processors, implementation of the desired inventory management action from the one or more suggested inventory management actions;
    determining the one or more suggested inventory management actions has been implemented; and
    facilitating an update to a website of the second merchant for the identified item available for purchase based at least in part on the implementation of at least one of the one or more suggested inventory management actions.

2. The computer-implemented method of claim 1, wherein the one or more suggested inventory management actions comprises one of requesting an increased quantity of the identified item for purchase to a fulfillment center located in the geographic region, requesting a decreased quantity of the identified item for purchase to the fulfillment center located in the geographic region, changing a fulfillment delivery speed associated with the identified item for purchase, or initiating transfer of the identified item for purchase to the fulfillment center located in the geographic region.

3. The computer-implemented method of claim 1, further comprising:
    retrieving, by the one or more processors, a second set of one or more policies;
    prioritizing, by the one or more processors, the one or more suggested inventory management actions based at least in part on the second set of one or more policies; and
    facilitating, by the one or more processors, implementation of at least one of the one or more suggested inventory management actions based at least in part on the prioritization.

4. The computer-implemented method of claim 3, wherein the sources associated with the one or more merchants comprise at least one of a web server, a datastore, data received from a user compensated for obtaining and transmitting data via a user device, data received from the user device as a user interacts with a user application, or direct feedback from the user.

5. The computer-implemented method of claim 1, wherein obtaining data for the plurality merchandise from the sources associated with the one or more merchants further comprises obtaining the data for the plurality of merchandise from the sources on a periodic basis.

6. The computer-implemented method of claim 1, further comprising:

identifying, by the one or more processors, one or more merchants based on one or more of an annual revenue of a merchant, ranking of the merchant based at least in part on a measurement of popularity, user search queries, or identification of merchants based on user surveys.

7. The computer-implemented method of claim 1, wherein the merchandise data comprises merchandise fulfillment delivery speed in the defined geographic region associated with the identified item for purchase, or pricing associated with the merchandise fulfillment delivery speed.

8. The computer-implemented method of claim 1, wherein the set of one or more policies comprise one or more rules for filtering merchandise data.

9. A system comprising:
- at least one memory storing computer-executable instructions; and
- at least one processor, wherein the at least one processor is configured to access the at least one memory and to execute the computer-executable instructions to:
  - obtain merchandise data from sources associated with one or more merchants offering merchandise to users in a defined geographic region;
  - retrieve a set of one or more policies;
  - analyze the obtained data, based at least in part on the one or more policies, to identify merchandise, pricing associated with identified merchandise, and an associated fulfillment delivery speed available via a first merchant of the one or more merchants in the defined geographic region, wherein the fulfillment delivery speed comprises a time for delivery to the defined geographic region;
  - generate one or more suggested inventory management actions affecting a price of the identified item available for purchase via a second merchant, and further affecting an availability, in the defined geographic region, of the identified merchandise available via the second merchant based at least in part on the analyzed data;
  - cause presentation of the one or more suggested inventory management actions by a user device;
  - receive an indication corresponding to a selection, detected by the user device of a desired inventory management action; and
  - facilitate, based at least in part on the selection detected by the user device, implementation of at least one of the one or more suggested inventory management actions.

10. The system of claim 9, wherein the merchandise data comprises merchandise fulfillment delivery speed in the defined geographic region associated with the identified merchandise, or pricing associated with the merchandise fulfillment delivery speed.

11. The system of claim 9, wherein the at least one processor is configured to access the at least one memory and to further execute the computer-executable instructions to:
- determine that the at least one of the one or more suggested inventory management actions has been implemented; and
- facilitate an update to a website of the second merchant for the identified merchandise based at least in part on the implementation of at least one of the one or more suggested inventory management actions.

12. The system of claim 9, wherein the one or more suggested inventory management actions comprises at least one of requesting an increased quantity of the identified merchandise to a fulfillment center located in the geographic region, requesting a decreased quantity of the identified merchandise to the fulfillment center located in the geographic region, initiating transfer of the identified merchandise to the fulfillment center located in the geographic region, or changing a price associated with fulfillment delivery speed of the identified merchandise to the geographic region.

13. The system of claim 9, wherein the sources associated with the one or more merchants comprise at least one of a web server, a datastore, data received from a user compensated for obtaining and transmitting data via a user device, data received from the user device as a user interacts with a user application, or direct feedback from the user.

14. The system of claim 9, wherein the at least one processor is configured to access the at least one memory and to further execute the computer-executable instructions to:
- identify one or more merchants based on one or more of an annual revenue of a merchant, ranking of the merchant based at least in part on a measurement of popularity, user search queries, or identification of merchants based on user surveys.

* * * * *